United States Patent
Iwakiri et al.

(10) Patent No.: US 8,680,459 B2
(45) Date of Patent: Mar. 25, 2014

(54) MAINTENANCE METHOD OF RADIOLOGICAL IMAGE DETECTION APPARATUS

(75) Inventors: Naoto Iwakiri, Kanagawa (JP); Haruyasu Nakatsugawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 15 days.

(21) Appl. No.: 13/414,552

(22) Filed: Mar. 7, 2012

(65) Prior Publication Data

US 2012/0228485 A1 Sep. 13, 2012

(30) Foreign Application Priority Data

Mar. 9, 2011 (JP) .................... 2011-051773

(51) Int. Cl.
*G01D 18/00* (2006.01)
(52) U.S. Cl.
USPC ........................................ 250/252.1
(58) Field of Classification Search
USPC ............ 250/252.1, 370.01–370.15; 378/98.8
See application file for complete search history.

(56) References Cited

U.S. PATENT DOCUMENTS

| | | | | |
|---|---|---|---|---|
| 4,905,265 A * | 2/1990 | Cox et al. | | 378/98.8 |
| 5,617,461 A * | 4/1997 | Schreiner | | 378/98.5 |
| 6,488,409 B1 * | 12/2002 | Vafi et al. | | 378/207 |
| 6,521,886 B2 | 2/2003 | Aufrichtig et al. | | |
| 8,049,177 B2 | 11/2011 | Sato et al. | | |
| 2003/0063708 A1 * | 4/2003 | Shoji et al. | | 378/154 |
| 2003/0107001 A1 * | 6/2003 | Baumgartner et al. | | 250/370.11 |
| 2010/0193691 A1 | 8/2010 | Ishii et al. | | |
| 2011/0006213 A1 | 1/2011 | Sato et al. | | |

FOREIGN PATENT DOCUMENTS

| | | |
|---|---|---|
| JP | 61-153600 | 7/1986 |
| JP | 07-027864 A | 1/1995 |
| JP | 2004-518958 A | 6/2004 |
| JP | 2007170908 A * | 7/2007 |
| JP | 2009-133837 A | 6/2009 |
| JP | 2011-017683 A | 1/2011 |
| WO | 02/061455 A2 | 8/2002 |
| WO | 2008/090796 A1 | 7/2008 |
| WO | 2009/060968 A2 | 5/2009 |

\* cited by examiner

*Primary Examiner* — Kiho Kim
(74) *Attorney, Agent, or Firm* — Studebaker & Brackett PC

(57) ABSTRACT

An maintenance method of a radiological image detection apparatus including: a phosphor containing a fluorescent material which emits fluorescent light when exposed to radiation and a thin-film type sensor portion which is disposed adjacent to the phosphor on a radiation incidence side and supported by the phosphor and detects fluorescent light generated in the phosphor, the maintenance method includes: regularly performing at least one of a structural noise inspection, an MTF inspection and a dark current inspection, to detect deterioration of the phosphor.

18 Claims, 11 Drawing Sheets

MAINTENANCE METHOD OF RADIOLOGICAL IMAGE DETECTION APPARATUS

CROSS-REFERENCE TO RELATED APPLICATIONS

This application is based on and claims priority under 35 USC 119 from Japanese Patent Application No. 2011-051773 filed on Mar. 9, 2011; the entire content of which is incorporated herein by reference.

BACKGROUND

1. Technical Field

The present invention relates to a maintenance method of a radiological image detection apparatus.

2. Related Art

In recent years, radiological image detection apparatuses employing an FPD (Flat Panel Detector) for detecting a radiation image and generating digital image data are utilized in practice, and spreading rapidly because the image can be checked immediately in comparison with the case of a conventional imaging plate. Such radiological image detection apparatuses of various types are proposed. An example of this is an indirect conversion type.

A radiological image detection apparatus of indirect conversion type has: a scintillator formed from fluorescent material such as CsI (cesium iodide) for emitting fluorescence in response to radiation exposure; and a sensor panel constructed such that a plurality of photoelectric conversion elements and switching devices of thin-film type are arranged in two dimensions on a substrate. Radiation transmitted through an image-taking object is converted into light by a scintillator in the radiation image conversion panel. Then, the fluorescence from the scintillator is converted into electric signals by the photoelectric conversion elements in the sensor panel.

Further, a radiological image detection apparatus of so-called front face reading (ISS: Irradiation Side Sampling) type is also proposed that is obtained by modifying a radiological image detection apparatus of indirect conversion type such that radiation enters from the sensor panel side (for example, see Patent Document 1 (JP-A-7-27864)). According to this radiological image detection apparatus, the intensity of fluorescence of the scintillator emitted near the sensor panel increases and hence sensitivity is improved. This reduces the amount of exposure necessary for detection of a radiation image, and hence reduces the amount of exposure in an image-taking object.

Further, a technique is also proposed that a scintillator is constructed in the form of a group of columnar crystals made of fluorescent material such as CsI so as to improving the sensitivity of the radiological image detection apparatus (for example, see Patent Document 2 (JP-A-2011-017683)). Columnar crystals formed by gas-phase deposition do not include impurities such as binder, and further provides a lightguide effect of guiding the emitted fluorescence along the direction of crystal growth and hence suppresses diffusion of the fluorescence. This improves the sensitivity of the radiological image detection apparatus and improves the sharpness of the image.

Here, in the radiological image detection apparatus of ISS type, radiation is transmitted through the substrate of the sensor panel and then enters the scintillator. The substrate of the sensor panel is typically composed of glass. Nevertheless, glass absorbs radiation in not a little amount. This causes a concern of attenuation of the radiation entering the scintillator. Thus, in the radiological image detection apparatus described in Patent Document 1, the substrate of the sensor panel is composed of a resin sheet having a lower radiation absorbing power than the glass. Alternatively, even when glass is employed, a glass sheet as thin as a few 100 μm or the like is adopted.

The characteristics of radiological image detection apparatuses of the above type may vary as they deteriorate with age, and a modulation transfer function (MTF) and a noise power spectrum, for example, are employed as evaluation items of deteriorations with age (refer to Patent document 3 (JP-T-2004-518958(The symbol "JP-T" as used herein means a published Japanese translation of a PCT patent application.)), for example).

In ISS radiological image detection apparatuses, the attenuation of radiation entering the scintillator is further reduced if the substrate of the sensor panel is removed. However, if the substrate is peeled off, the moisture resistance which is attained by the substrate is lost. As a result, moisture permeates into the sensor thin film in which the photoelectric conversion elements and the switch elements are formed and may even permeate into the scintillator through the sensor thin film. Since CsI which is the material of the scintillator exhibits deliquescence, the scintillator may deteriorate due to the moisture permeation.

Where the substrate exists, the deterioration of the scintillator due to moisture permeation advances from its peripheral portion. On the other hand, if the substrate is peeled off, the moisture permeation occurs over the entire area of the scintillator and the scintillator may deteriorate from its central portion. Since the central portion of the scintillator is mainly used for radiation image detection, to maintain high accuracy of diagnoses that are based on radiation images, it is necessary to detect deterioration of the scintillator properly.

In the maintenance method disclosed in Patent document 3, deterioration of a detection apparatus is detected by monitoring a variation with age of NPS which is the sum of various noises such as a structural noise of a scintillator, an X-ray quantum noise, and an electrical noise of a sensor panel. Whereas deterioration of a scintillator appears as the structural noise, the contribution of the structural noise to NPS is relatively small. Therefore, it is difficult for NPS evaluation to detect deterioration of a scintillator properly. Furthermore, to extract only a structure noise component from NPS, it is necessary to perform a complex analysis on many images that are acquired under such various sets of conditions that individual noise components can be discriminated from each other. As such, extraction of only a structure noise component is difficult.

SUMMARY

An illustrative aspect of the invention is to detect deterioration of a phosphor properly and easily.

According to an aspect of the invention, an maintenance method of a radiological image detection apparatus including: a phosphor containing a fluorescent material which emits fluorescent light when exposed to radiation and a thin-film type sensor portion which is disposed adjacent to the phosphor on a radiation incidence side and supported by the phosphor and detects fluorescent light generated in the phosphor, the maintenance method comprising: regularly performing at least one of a structural noise inspection, an MTF inspection and a dark current inspection, to detect deterioration of the phosphor, in which the structural noise inspection includes taking a radiation image and detecting a variation in a pattern unique to the radiological image detection apparatus between the radiation image taken and an image taken in the past: the MTF inspection includes taking a radiation image of an MTF chart and detecting an MTF variation of the radiation image taken; and the dark current inspection includes taking a black image without irradiation and detecting a dark current variation in the sensor portion on the basis of the black image taken.

With the method, it is possible to detect deterioration of the phosphor properly and easily.

DETAILED DESCRIPTION

Figure 1:
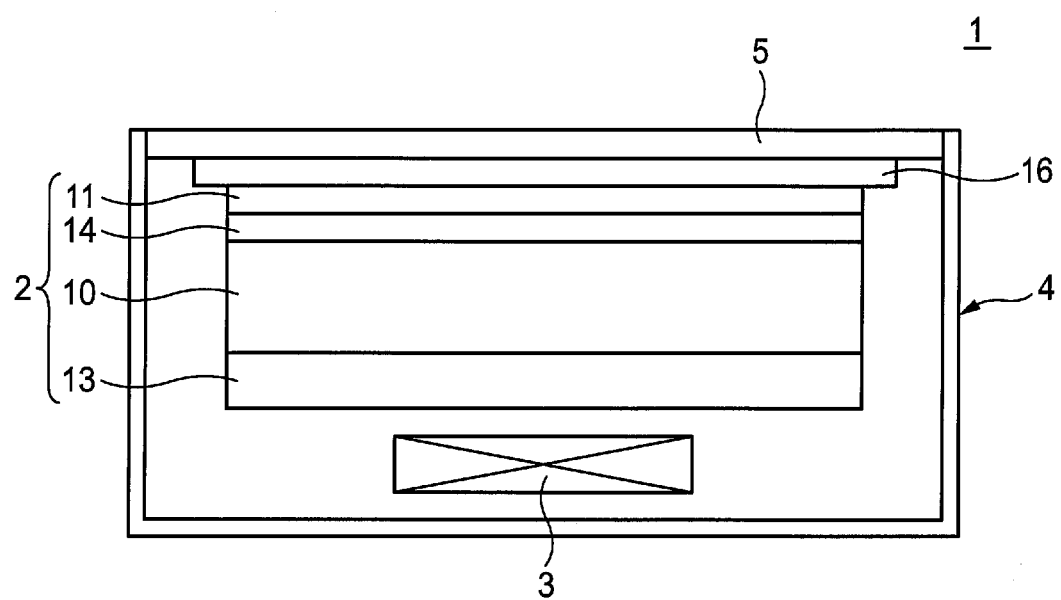
FIG. 1 shows the configuration of an example radiological image detection apparatus to be used for describing maintenance methods according to embodiments of the present invention.

FIG. 1 shows the configuration of an example radiological image detection apparatus to be used for describing maintenance methods according to embodiments of the present invention.

The radiological image detection apparatus 1 shown in FIG. 1 is a portable radiological image detection apparatus (hereinafter referred to as a cassette). The cassette 1 is equipped with a detection portion 2 for detecting radiation, a control portion 3 for controlling the operation of the detection portion 2 and generating a radiation image on the basis of the radiation detected by the detection portion 2, and a housing 4 which houses the detection portion 2 and the control portion 3.

In the housing 4, a subject (e.g., a shooting subject part of a patient) is placed on a top plate 5 which overlaps with the detection portion 2. Radiation coming from the subject passes through the top plate 5 and entering the detection portion 2. The top plate 5 is made of a material which is low in radiation absorptivity, typically carbon-fiber-reinforced plastics or aluminum.

The detection portion 2 is equipped with a scintillator (phosphor) 10 which emits fluorescent light when exposed to radiation and a sensor portion 11 for detecting the fluorescent light produced by the scintillator 10.

The scintillator 10 is separate from the sensor portion 11 and is formed on a support 13. A resin layer 14 for optically coupling the scintillator 10 to the sensor portion 11 is sandwiched between them, and its surface, opposite to the support 13, of the scintillator 10 is bonded to the sensor portion 11.

An adhesive layer 16 is sandwiched between the top plate 5 and the detection portion 2 in which the support 13, the scintillator 10, and the sensor portion 11 are laid on each other as described above, and the surface, on the side of the sensor portion 11, of the detection portion 2 is bonded to the top plate 5.

In the cassette 1 of this example which is an ISS radiological image detection apparatus, radiation entering the detection portion 2 passes through the sensor portion 11 and enters the scintillator 10. Fluorescent light is generated in the scintillator 10 in response to the radiation and detected by the sensor portion 11. The cassette 1 has high sensitivity because the radiation incidence side of the scintillator 10 that generates more fluorescent light is located adjacent to the sensor portion 11.

Alternatively, the detection portion 2 may be covered with a protective film made of parylene or the like and then bonded to the top plate 5. The entire sensor-unit-11-side surface of the detection portion 2 may be bonded to the top plate. Alternatively, from the viewpoint of reworkability in, for example, replacing the top plate 5, only a portion (e.g., a central portion or a peripheral portion) of the sensor-unit-11-side surface of the detection portion 2 may be bonded to the top plate 5. In this case, it is preferable to form the adhesive layer 16 so that no closed space is formed between the detection portion 2 and the top plate 5, that is, so that an air escape path that communicates with the outside is formed. With this measure, air bubbles are not prone to stay between the detection portion 2 and the top plate 5 even if an atmospheric pressure or temperature variation occurs or a weight acts on the top plate 5.

Figure 2:
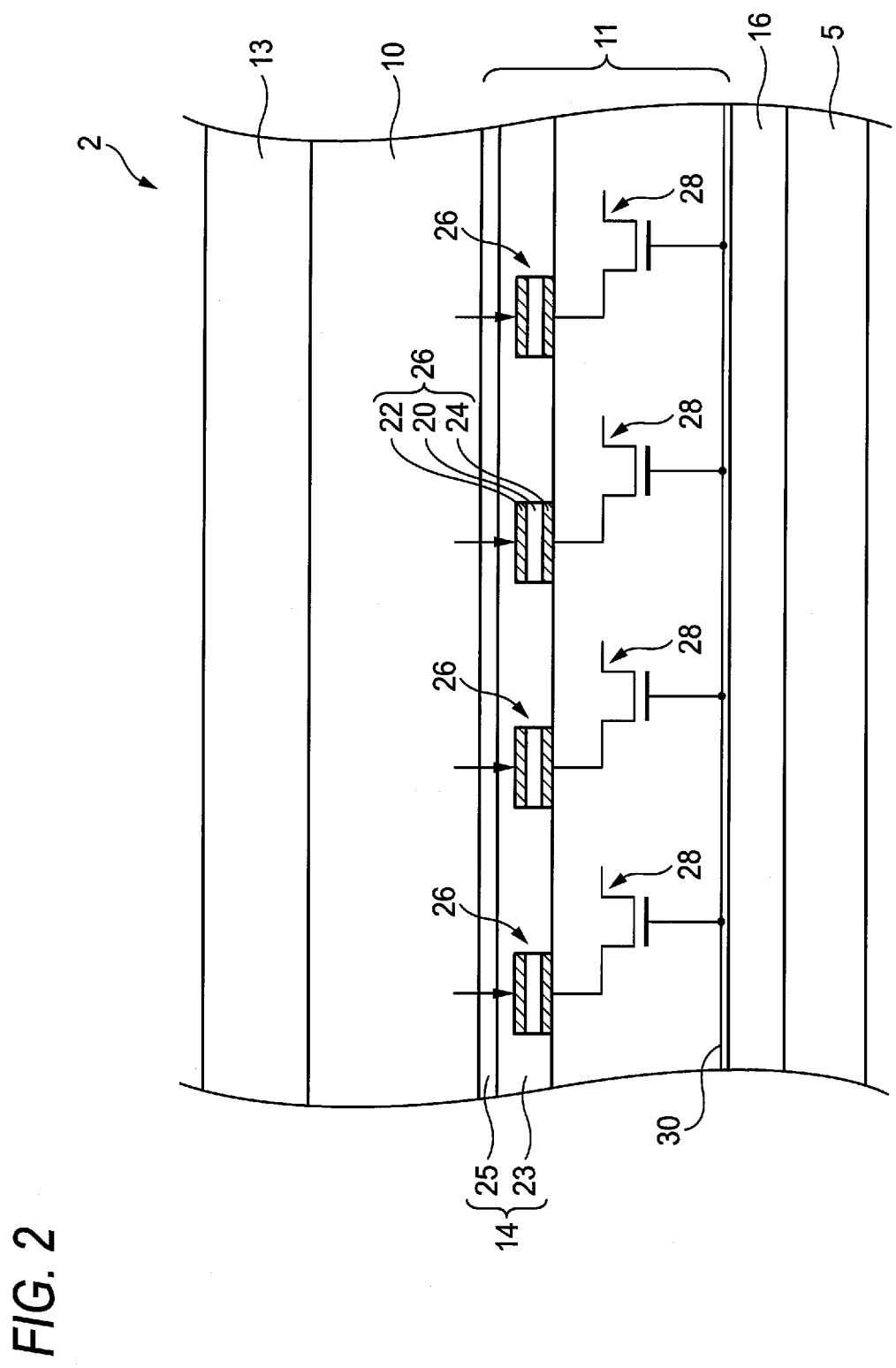
FIG. 2 schematically shows the configuration of a detection portion of the radiological image detection apparatus of FIG. 1.
Figure 3:
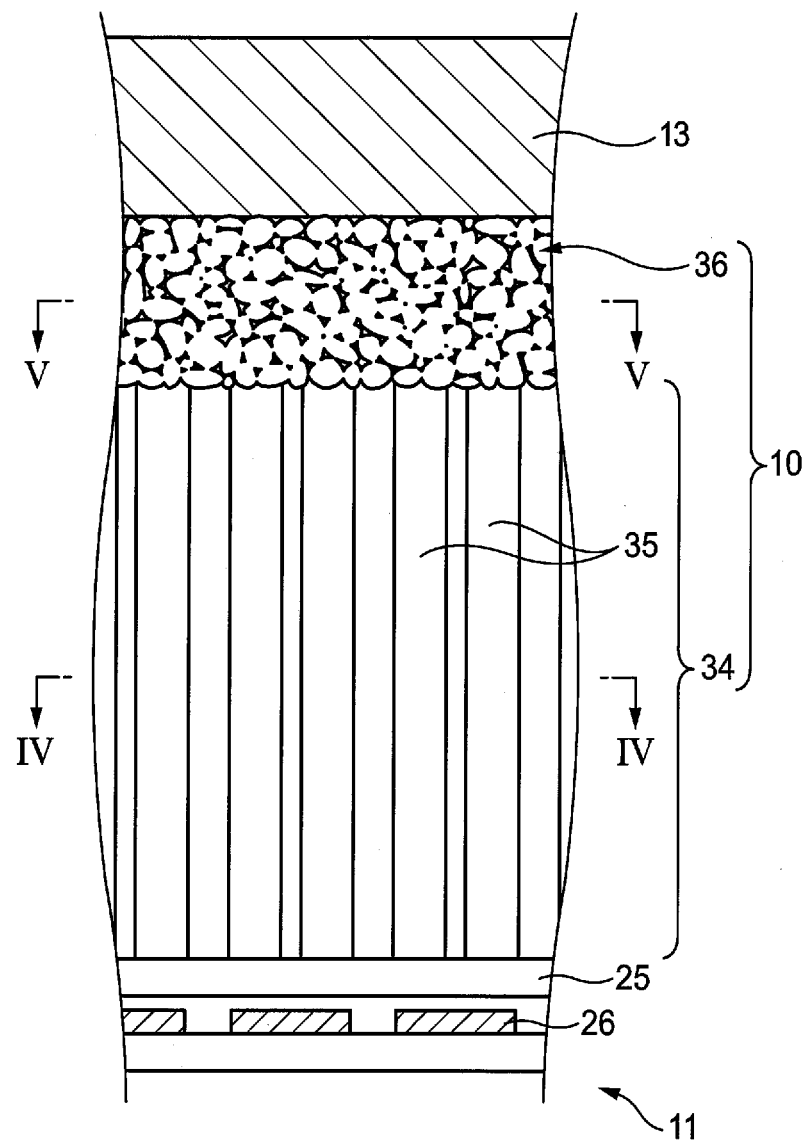
FIG. 3 schematically shows the configuration of a phosphor of the detection portion of FIG. 2.

FIG. 2 shows the configuration of the detection portion 2 of the cassette 1. FIG. 3 schematically shows the configuration of the scintillator 10 of the detection portion 2.

Employable fluorescent materials for constituting the scintillator 10 include CsI:Tl (thallium-activated cesium iodide), NaI:Tl (thallium-activated sodium iodide), and CsI:Na (sodium-activated cesium iodide). Among these, CsI:Tl is preferable in the point that the emission spectrum matches with the maximal point (near 550 nm) in the spectral sensitivity of an a-Si photodiode.

The scintillator 10 is constructed from: a columnar portion 34 provided on the side opposite to the support 13; and a non-columnar portion 36 provided on the support 13 side. Although details are described later, the columnar portion 34 and the non-columnar portion 36 are formed continuously in the form of stacked layers on the support 13 by gas-phase deposition. Here, the columnar portion 34 and the non-columnar portion 36 are composed of the same fluorescent material. However, the amount of added activation agent such as T1 may be different from each other.

The columnar portion 34 is formed out of a group of columnar crystals 35 in which crystals of the fluorescent material have grown into columnar shapes. Here, in some cases, a plurality of neighboring columnar crystals are linked together so as to form one columnar crystal. A gap is formed between adjacent columnar crystals 35, and hence the columnar crystals 35 are independent of each other.

The non-columnar portion 36 is constructed from a group of relatively small crystals of the fluorescent material. Here, in some cases, the non-columnar portion 36 contains amorphous material of the above-mentioned fluorescent material. In the non-columnar portion 36, the crystals are irregularly linked together or overlapped with each other and hence no clear gap is formed between the crystals.

In the scintillator 10, the surface on the side opposite to the support 13, that is, the surface on the tip side of each columnar crystal of the columnar portion 34 is bonded to the sensor portion 11. Thus, on the radiation entering side of the scintillator 10, the columnar portion 34 composed of the group of columnar crystals 35 is arranged.

The fluorescence emitted by the columnar crystals 35 is total-reflected repeatedly within each columnar crystal 35 by virtue of the refractive index difference between the columnar crystal 35 and the gap (air) in the surroundings, so that diffusion of the fluorescence is suppressed and the fluorescence is guided to the sensor portion 11. This improves the sharpness of the image.

Then, among the fluorescence emitted by the columnar crystal 35, the fluorescence traveling toward the side opposite to the sensor portion 11, that is, toward the support 13, is reflected toward the sensor portion 11 by the non-columnar portion 36. This improves the efficiency of fluorescence utilization and hence the sensitivity.

Each columnar crystal 35 is relatively thin at an initial stage of growth and becomes thicker as the crystal growth proceeds. In a portion, joined to the non-columnar portion 36, of the columnar portion 34, many small-diameter columnar crystals 35 stand together and a large number of relatively large gaps extend in the crystal growth direction to produce a large space ratio. On the other hand, the non-columnar portion 36 is formed by relatively small crystals and aggregates of relatively small crystals and individual gaps are relatively small. The non-columnar portion 36 is denser and smaller in space ratio than the columnar portion 34. The presence of the non-columnar portion 36 between the support 13 and the columnar portion 34 increases the adhesion between the support 13 and the scintillator 10. As a result, the scintillator 10 is prevented from being peeled off the support 13.

Figure 4:
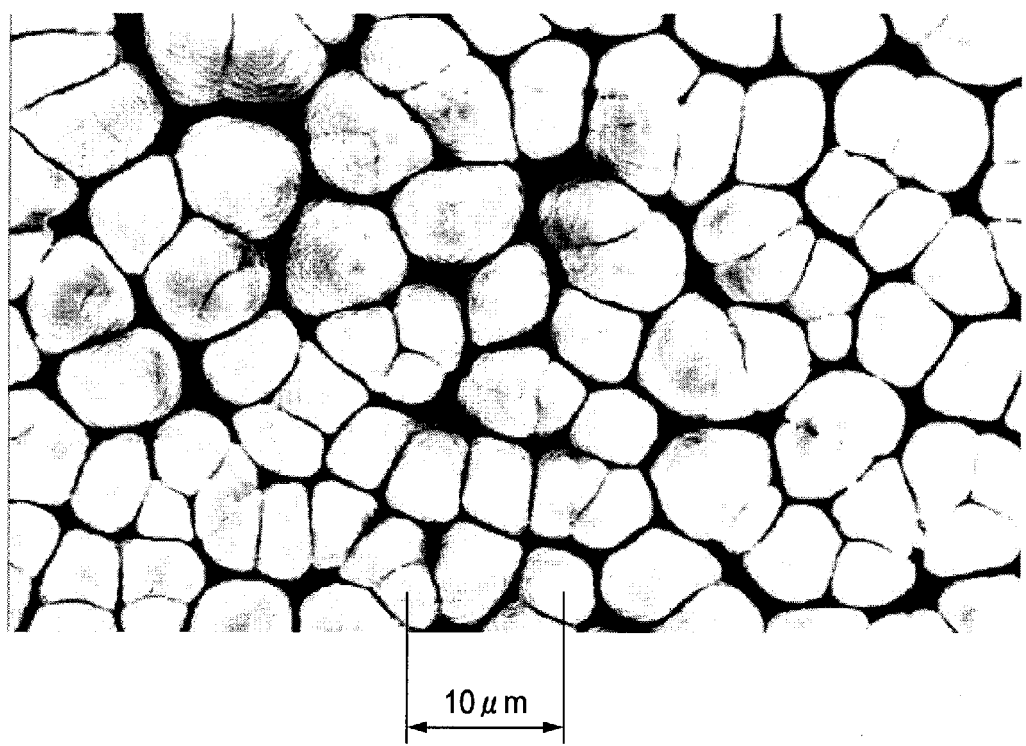
FIG. 4 is a sectional view of the phosphor taken along line IV-IV in FIG. 3.

FIG. 4 is an electron microscopy photograph showing the IV-IV cross section of the scintillator 10 shown in FIG. 3.

As seen from FIG. 4, in the columnar portion 34, the columnar crystals 35 have a cross portion of almost uniform diameter in the direction of crystal growth. Further, a gap is formed around each columnar crystal 35. Thus, the columnar crystals 35 stand independently of each other. Preferably, the crystal diameter (the pillar diameter) of the columnar crystal 35 is 2 μm or greater and 8 μm or smaller from the perspectives of the lightguide effect, the mechanical strength, and the picture-element defect prevention. An excessively small pillar diameter causes insufficiency in the mechanical strength of the columnar crystal 35. Thus, a concern of damage by a shock or the like arises. In contrast, an excessively large pillar diameter causes insufficiency in the number of columnar crystals 35 assigned to each pixel. Thus, a concern arises that when a crack occurs in a crystal, the pixel becomes defective at high probabilities.

Here, the pillar diameter indicates the maximum diameter of the crystal viewed from the upper face side in the growth direction of the columnar crystal 35. As a detailed measurement method, the pillar diameter is measured by observation of the columnar crystal 35 from the upper face side in the growth direction by using an SEM (scanning electron microscope). The observation is performed at a magnification factor (of approximately 2000) that allows observation of 100 to 200 columnar crystals 35. Then, the maximum value of pillar diameter is measured for each crystal contained in one image-taking frame. Then, the average value is calculated. The pillar diameter value (μm) is measured to the second digit below the decimal point. Then, a value obtained by rounding at the second digit below the decimal point is adopted as the average in accordance with JIS Z 8401.

Figure 5:
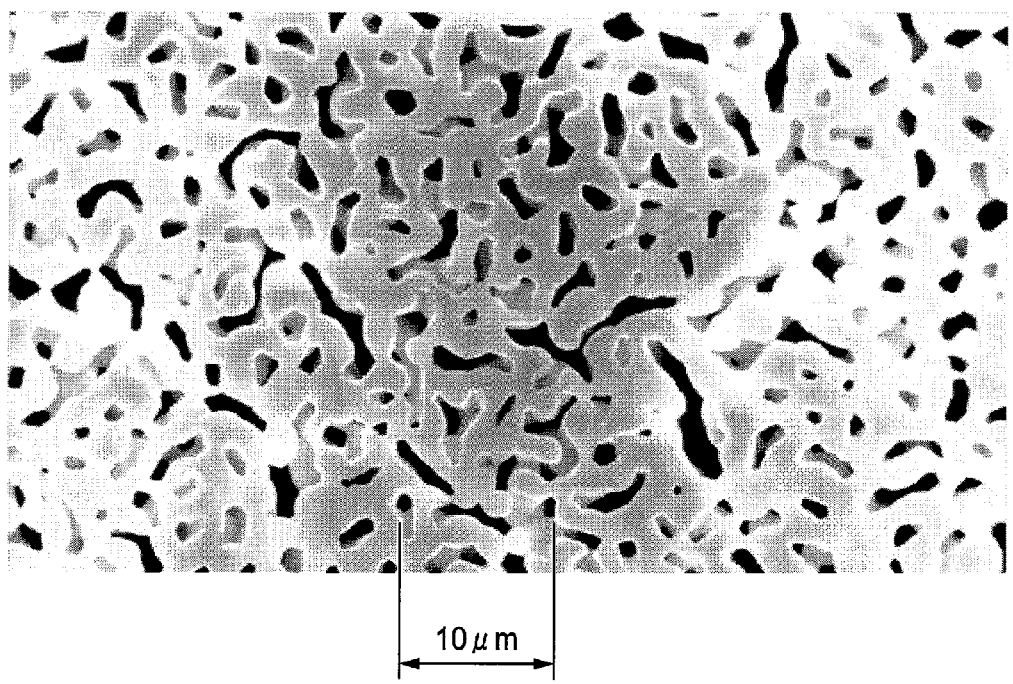
FIG. 5 is a sectional view of the phosphor taken along line V-V in FIG. 3.

FIG. 5 is an electron microscopy photograph showing the V-V cross section of the scintillator 10 shown in FIG. 3.

As seen from FIG. 5, in the non-columnar portion 36, the crystals are irregularly linked together or overlapped with each other. Thus, clear gaps between crystals are not seen in comparison with the situation in the columnar portion 34. Preferably, the diameter of the crystals constituting the non-columnar portion 36 is 0.5 μm or greater and 7.0 μm or smaller from the perspectives of close contact and light reflection. When the crystal diameter is excessively small, the gap approaches 0 and hence a concern arises that the function of light reflection is degraded. When the crystal diameter is excessively large, flatness is degraded and hence a concern arises that close contact with the support 13 is degraded. Further, preferably, the shape of each crystal constituting the non-columnar portion 36 is approximately spherical from the perspective of light reflection.

Here, measurement of the crystal diameter in a case that the crystals are linked together is performed as follows. Each line obtained by joining depressions (recesses) formed between adjacent crystals is regarded as a boundary between the crystals so that the linked crystals are separated into smallest polygons. Then, the pillar diameter and the crystal diameter corresponding to the pillar diameter are measured. Then, the average is calculated and adopted similarly to the method adopted for the crystal diameter in the columnar portion 34.

Further, preferably, the thickness of the columnar portion 34 is 200 μm or greater and 700 μm or smaller, although depending on the energy of radiation, from the perspectives of sufficient radiation absorption in the columnar portion 34 and the sharpness of the image. When the thickness of the columnar portion 34 is excessively small, the radiation is not sufficiently absorbed and hence a concern of degraded sensitivity arises. When the thickness is excessively great, light diffusion occurs and hence a concern arises that degradation in the sharpness of the image is not avoided even by the lightguide effect of the columnar crystal.

Preferably, the thickness of the non-columnar portion 36 is 5 μm or greater and 125 μm or smaller from the perspectives of close contact with the support 13 and light reflection. When the thickness of the non-columnar portion 36 is excessively small, a concern arises that sufficiently close contact with the support 13 is not obtained. When the thickness is excessively great, an increase occurs in the contribution of the fluorescence by the non-columnar portion 36 and in the diffusion caused by light reflection in the non-columnar portion 36. Thus, a concern of degradation in the sharpness of the image arises.

The material used for the support 13 is not limited to particular one as long as the scintillator 10 is allowed to be formed thereon. For example, the support 13 may be fabricated from a carbon plate, a CFRP (carbon fiber reinforced plastic), a glass plate, a quartz substrate, a sapphire substrate, or a metal sheet composed of material selected from iron, tin, chromium, aluminum, and the like. Among these, a metal sheet composed of aluminum or aluminum alloy is preferably employed that has reflectivity with respect to the fluorescence emitted by the columnar crystals of the scintillator 10.

When the support 13 is fabricated from a metal sheet composed of aluminum or aluminum alloy, among the fluorescence emitted by the columnar crystal 35, the fluorescence traveling toward the side opposite to the sensor portion 11, that is, toward the support 13, is reflected toward the sensor portion 11. This improves the efficiency of fluorescence utilization and hence the sensitivity. Here, even a carbon plate or the like other than a metal sheet composed of aluminum or aluminum alloy is employed, a similar effect is obtained when a coating film composed of aluminum or aluminum alloy is formed on the surface onto which the scintillator 10 is to be formed.

Further, the CsI constituting the scintillator 10 has a tendency that the sensitivity decreases with increasing temperature. The cassette 1 of the present example is of ISS type as described above. In this case, the control portion 3 is typically arranged behind the support 13 (opposite to the scintillator 10) and hence the heat generated in the control portion 3 is transmitted to the support 13. Thus, when the support 13 is fabricated from a metal sheet composed of aluminum or aluminum alloy having a satisfactory thermal conductivity, the heat transmitted from the control portion 3 is diffused rapidly. This avoids local temperature rise in the scintillator 10 and local sensitivity degradation caused by this. Thus, occurrence of image non-uniformity is avoided.

The non-columnar portion 36 and the columnar portion 34 of the scintillator 10 are formed continuously and integrally in this order on the support 13 by gas-phase deposition or the like. Specifically, under the environment of a vacuum pressure of 0.01 to 10 Pa, CsI:Tl is heated and evaporated by means of energizing a resistance-heating type crucible. Then, in a state that the temperature of the support 13 is maintained in the range from a room temperature (20° C.) to 300° C., CsI:Tl is deposited on the support 13.

When CsI:Tl of crystal phase is to be formed on the support 13, first, crystals of relatively small diameter are deposited so that the non-columnar portion 36 is formed. Then, the columnar portion 34 is formed successively to the formation of the non-columnar portion 36, in a state that at least one condition selected from the vacuum pressure and the temperature of the support 13 is changed. Specifically, the group of columnar crystals 35 is grown in a state that the vacuum pressure is increased and/or the temperature of the support 13 is increased.

As described above, the scintillator 10 is fabricated efficiently and easily. Further, this fabrication method has an advantage that when the vacuum pressure and the support temperature are controlled, scintillators of various kinds of specifications are simply fabricated in accordance with the designs.

Figure 6:
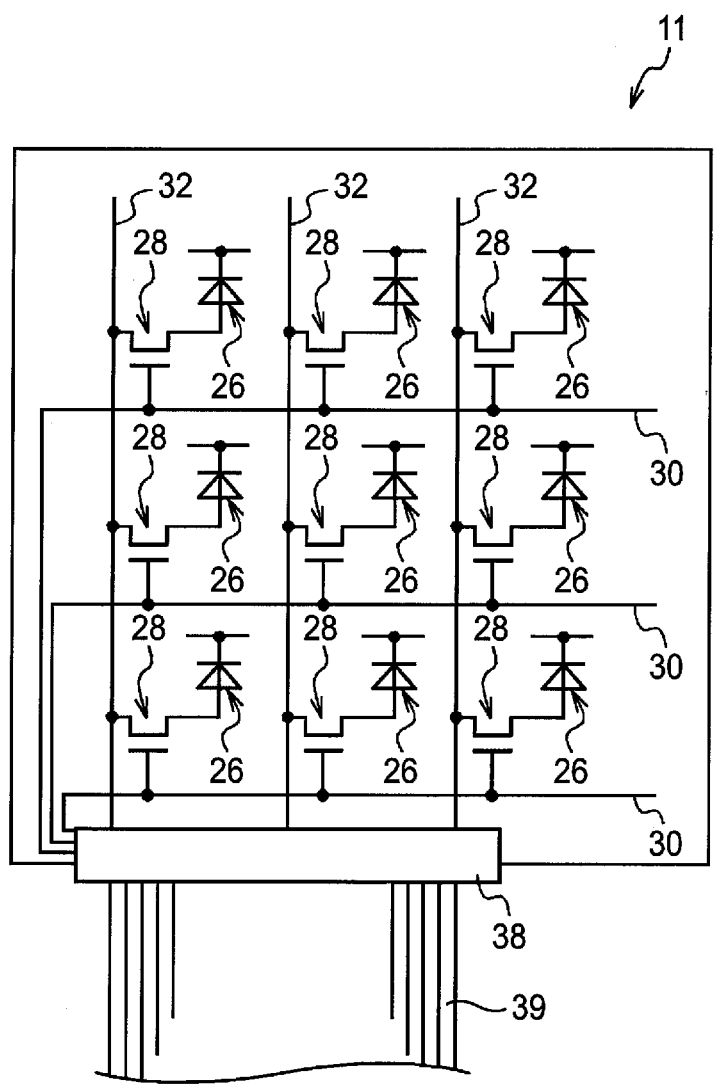
FIG. 6 schematically shows the configuration of a sensor portion of the detection portion of FIG. 2.

Next, the sensor portion 11 is described below with reference to FIGS. 2 and 6. FIG. 6 shows the configuration of the sensor portion 11 of the detection portion 2.

The sensor portion 11 has: a plurality of photoelectric conversion elements 26; and a plurality of switching devices 28 each composed of a thin-film transistor (TFT) for reading charge generated in each of the photoelectric conversion elements 26. Each photoelectric conversion element 26 is an element of thin-film type. Then, a photoconductive layer 20 for generating charge when fluorescence from the scintillator 10 is received is formed from a thin film composed of inorganic or organic photoelectric conversion material. These photoelectric conversion elements 26 and switching devices 28 are arranged in two dimensions.

Here, in the illustrated example, the array of photoelectric conversion elements 26 and the array of switching devices 28 are formed in different layers from each other. The array of photoelectric conversion elements 26 is arranged on the scintillator 10 side. Here, the array of photoelectric conversion elements 26 and the array of switching devices 28 may be formed in the same layer. Alternatively, the array of switching devices 28 and the array of photoelectric conversion elements 26 may be formed in this order from the scintillator 10 side. Then, as in the illustrated example, when the array of photoelectric conversion elements 26 and the array of switching devices 28 are formed in different layers from each other, the size of each photoelectric conversion element 26 is allowed to be large. Further, when the array of photoelectric conversion elements 26 and the array of switching devices 28 are formed in this order from the scintillator side, the photoelectric conversion elements 26 are allowed to be arranged closer to the scintillator 10. This improves the sensitivity.

On the array of photoelectric conversion elements 26, a flattening layer 23 is formed for covering these photoelectric conversion elements 26 so as to flatten the surface thereof. Further, an adhesive layer 25 for bonding the scintillator 10 with the sensor portion 11 is formed on the flattening layer 23. The flattening layer 23 and the adhesive layer 25 constitute the above-mentioned resin layer 14. Preferably, the thickness of the resin layer 14 is 50 μM or smaller and, more preferably, in the range from 5 μm to 30 μm from the perspectives of sensitivity and image sharpness.

Each photoelectric conversion element 26 is constructed from: a photoconductive layer 20 for generating charge when receiving the fluorescence from the scintillator 10; and a pair of electrodes provided respectively on the front and the rear surfaces of the photoconductive layer 20. The electrode 22 provided on the surface on the scintillator 10 side of the photoconductive layer 20 is a bias electrode used for applying a bias voltage on the photoconductive layer 20. The electrode 24 provided on the opposite side surface is a charge collecting electrode for acquiring the charge generated by the photoconductive layer 20. The charge collecting electrode 24 of the photoelectric conversion element 26 is connected to the corresponding one of the switching devices 28. The charge collected by each charge collecting electrode 24 is read through the switching device 28.

The layer in which the array of switching devices 28 is formed is provided with: a plurality of gate lines 30 extending in one direction (the row direction) and turning ON or OFF the individual switching devices 28; and a plurality of signal lines (data lines) 32 extending in the direction (the column direction) perpendicular to the gate lines 30 and reading the charge through the switching devices 28 in an ON state. Then, a connection terminal portion 38 connected to the gate lines 30 and the signal lines 32 is arranged in the periphery of the sensor portion 11. As shown in FIG. 2, the connection terminal portion 38 is connected through a connection circuit 39 to a circuit board (not shown) provided in the control portion 3 (see FIG. 1). This circuit board has a gate driver and a signal processing portion.

In response to signals provided from the gate driver through the gate lines 30, the switching devices 28 are turned ON row by row. Then, the charge read through each switching device 28 in the ON state is transmitted as a charge signal through the signal line 32, and then inputted to the signal processing portion. Thus, the charge is read sequentially row by row, and then converted into electric signals by the above-mentioned signal processing portion so that digital image data is generated.

In the sensor portion 11 having the above-mentioned configuration, the array of photoelectric conversion elements 26 and switching devices 28 is formed, for example, on an insulating substrate such as a glass substrate by using a publicly known film formation technique. Then, the sensor panel constructed such that the array of photoelectric conversion elements 26 and switching devices 28 is formed on the insulating substrate is bonded to the scintillator 10 with the adhesive layer 25 in between.

Then, the insulating substrate is peeled off from the above-mentioned sensor panel bonded to the scintillator 10. Then, in the scintillator 10, the array of photoelectric conversion elements 26 and switching devices 28 remains and constitutes the sensor portion 11. After the insulating substrate has been peeled off, the array of photoelectric conversion elements 26 and switching devices 28 of thin-film type is supported by the scintillator 10. Here, an appropriate peel-off layer may be formed on the insulating substrate and then the array of photoelectric conversion elements 26 and switching devices 28 may be formed thereon so that the above-mentioned sensor panel may be constructed. This permits easy peel-off of the insulating substrate.

Capable of detecting a radiation image with high sensitivity at a high resolution, the cassette 1 can be used being incorporated in various apparatus such as X-ray imaging apparatus for medical examination such as mammography examination which are required to detect a sharp image with a low radiation dosage. The cassette 1 can also be used being incorporated in industrial X-ray imaging apparatus for nondestructive tests and used as a device for detecting γ-rays or particle rays such as α-rays or β-rays. As such, the cassette 1 has a wide application range.

Next, a maintenance method of the cassette 1 will be described.

Figure 7:
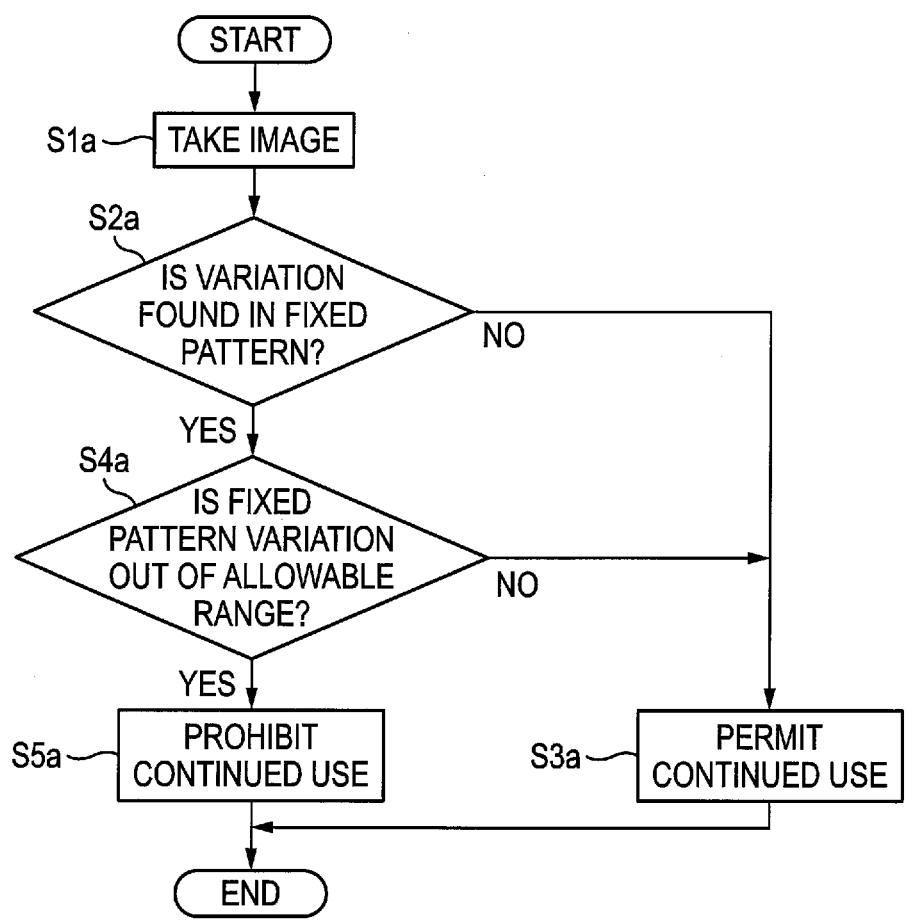
FIG. 7 is a flowchart of a maintenance method of a radiological image detection apparatus according to one embodiment of the invention.

FIG. 7 is an inspection process according to one embodiment which is applied to the cassette 1 and uses a structural noise.

A radiation image taken by the cassette 1 includes a structural noise that originates form the scintillator 10. In the scintillator 10 which is formed out of a group of columnar crystals of CsI or the like, a structural noise is caused by non-uniformity in thickness, crystal diameter, or crystal distribution and appears in an image as a fixed pattern that is unique to the cassette 1.

Since the insulative substrate has been peeled off as mentioned above, the cassette 1 lacks moisture resistance that would otherwise by provided by the insulative substrate. Therefore, over time, moisture permeates into the sensor portion 11 and may even permeate into the scintillator 10 through the sensor portion 11. Since CsI or the like which is the material of the scintillator 10 exhibits deliquescence, the columnar crystal structure of the scintillator 10 which is formed out of a group of columnar crystals of CsI or the like may deteriorate due to moisture absorption, as a result of which the fixed pattern included in a radiation image taken by the cassette 1 varies. Based on the above understanding, in this embodiment, deterioration of the scintillator 10 is detected by taking a radiation image regularly without a subject and monitoring a variation in the fixed pattern in each image thus taken.

First, a radiation image is taken at the time of manufacture or shipment of the cassette 1 and employed as a reference image.

At step S1a, a radiation image is taken (this is done regularly). At step S2a, a fixed pattern appearing in the image thus taken is compared with the fixed pattern in the reference image.

If no variation (e.g., a pattern blur, a local blur, or a positional deviation) is found in the fixed pattern, at step S3a continued use of the cassette 1 until the next inspection is permitted.

If a variation is found in the fixed pattern, it is judged at step S4a whether or not the variation is out of an allowable range. For example, this judgment is made by human visual evaluation.

If it is judged that the variation is out of the allowable range, at step S5a the use of the cassette 1 is stopped and a proper measure such as replacement of the scintillator 10 is taken.

On the other hand, if it is judged that the variation is within the allowable range, at step S3a continued use of the cassette 1 until the next inspection is permitted.

Since as described above a structural noise of the scintillator 10 appears as a fixed pattern in a radiation image taken by the cassette 1, deterioration of the scintillator 10 can be detected properly and easily by monitoring a variation in a fixed pattern that appears in each radiation image taken regularly and is unique to the cassette 1.

Figure 8:
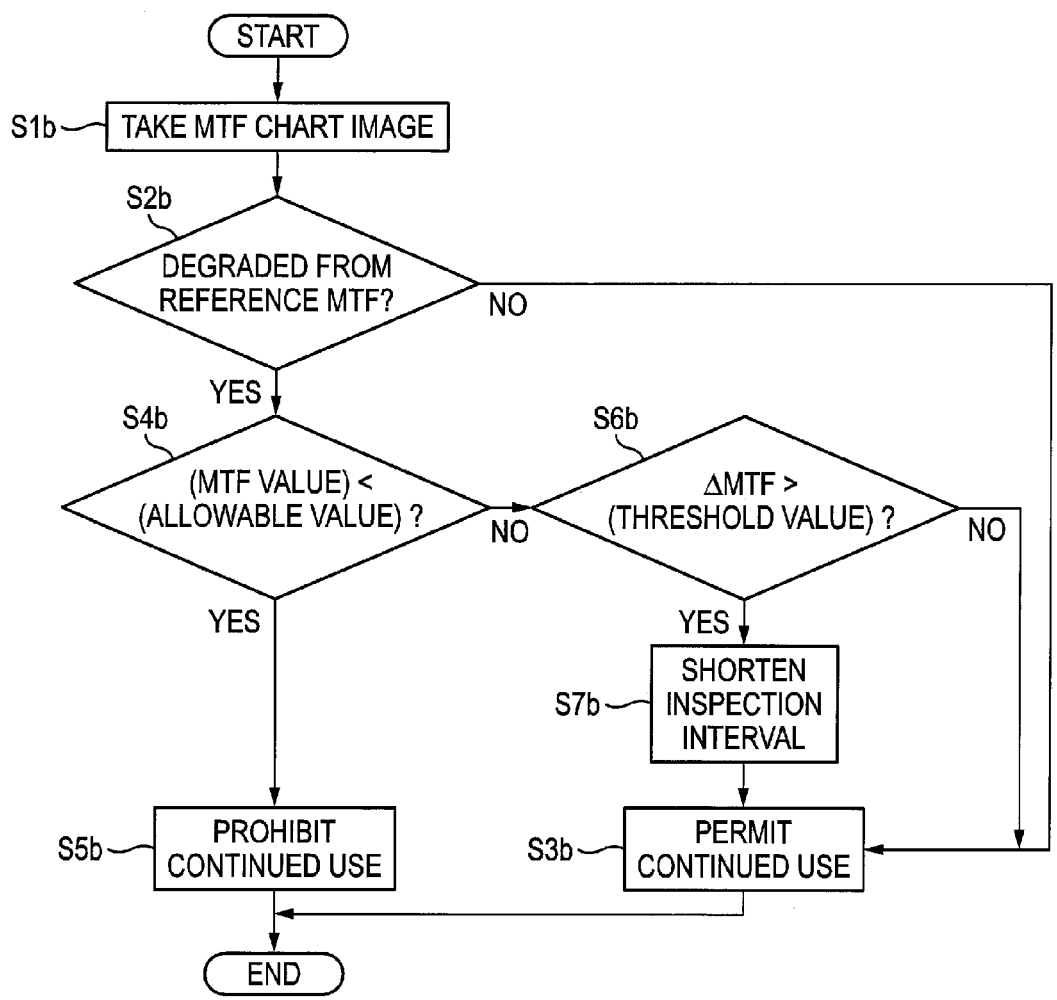
FIG. 8 is a flowchart of a maintenance method of a radiological image detection apparatus according to another embodiment of the invention.

FIG. 8 is an inspection process according to another embodiment which is applied to the cassette 1 and uses an MTF.

As described above, in the scintillator 10 which is formed out of a group of columnar crystals of CsI or the like, the columnar crystal structure of the scintillator 10 may deteriorate due to moisture absorption, as a result of which the light guide effect of the columnar crystals is impaired and the image sharpness image sharpness is lowered. Based on the above understanding, in this embodiment, deterioration of the scintillator 10 is detected by regularly taking a radiation image of an MTF chart in which plural thin lines are arranged like a one-dimensional lattice and monitoring an MTF variation in each image thus taken.

First, a radiation image of an MFT chart is taken at the time of manufacture or shipment of the cassette 1 and an MTF of the image thus taken is determined and employed as a reference MTF.

At step S1b, a radiation image of the MTF chart is taken (this is done regularly). At step S2b, an MTF of the image thus taken is determined and it is judged whether or not the determined MTF is degraded from the reference MTF.

If the determined MTF is not degraded from the reference MTF, at step S3b continued use of the cassette 1 until the next inspection is permitted.

If the determined MTF is degraded from the reference MTF, it is judged at step S4b whether or not the determined MTF is out of an allowable range by comparing an MTF value with a predetermined allowable value (allowable limit value).

If it is judged that the determined MTF is out of the allowable range (i.e., the MTF value is smaller than the allowable value), at step S5b the use of the cassette 1 is stopped and a proper measure such as replacement of the scintillator 10 is taken.

On the other hand, if it is judged that the determined MTF is within the allowable range (i.e., the MTF value is larger than or equal to the allowable value), at step S6b a difference Δ from the MTF value of the image that was taken in the preceding inspection is compared with a preset threshold value for differences Δ. If the difference Δ is smaller than or equal to the threshold value, at step S3b continued use of the cassette 1 until the next inspection is permitted. On the other hand, if the difference Δ is larger than the threshold value, at step S7b the interval to the next MTF inspection is shortened.

If the difference Δ from the MTF value of the image that was taken in the preceding inspection is larger than the threshold value, the deterioration of the scintillator 10 may be accelerating. Shortening the inspection interval makes it possible to detect deterioration of the scintillator 10 more properly and take a measure in good time.

Figure 9:
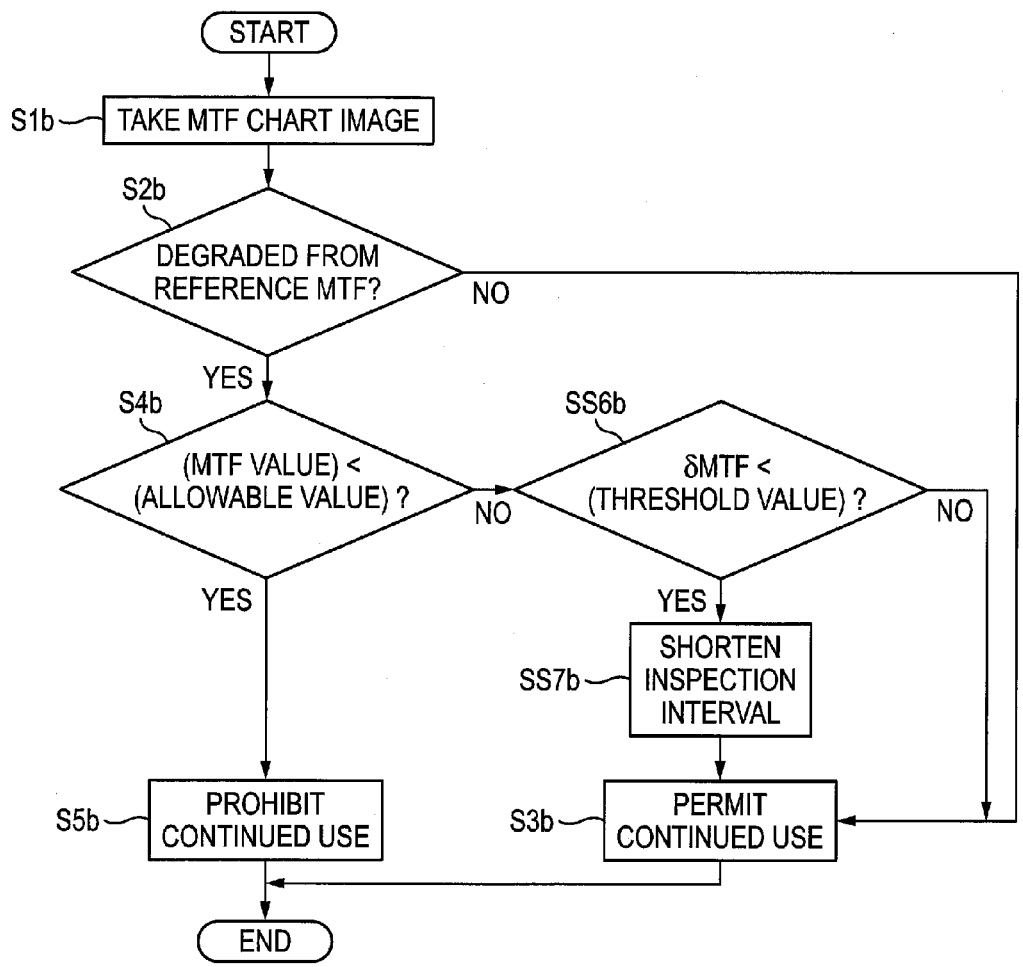
FIG. 9 is a flowchart of a maintenance method according to a modification of the embodiment of FIG. 8.

FIG. 9 is an inspection process according to a modification which is applied to the cassette 1 and uses an MTF.

If it is judged that the determined MTF is within the allowable range, at step SS6b a difference δ from the predetermined allowable value is compared with a preset threshold value for differences δ. If the difference δ is smaller than the threshold value, at step SS7b the interval to the next MTF inspection is shortened.

If the difference δ from the predetermined allowable value is smaller than the preset threshold value, the residual usable period of the scintillator 10 may be relatively short because it has deteriorated to a large extent. Shortening the inspection interval makes it possible to detect deterioration of the scintillator 10 more properly and take a measure in good time.

Figure 10:
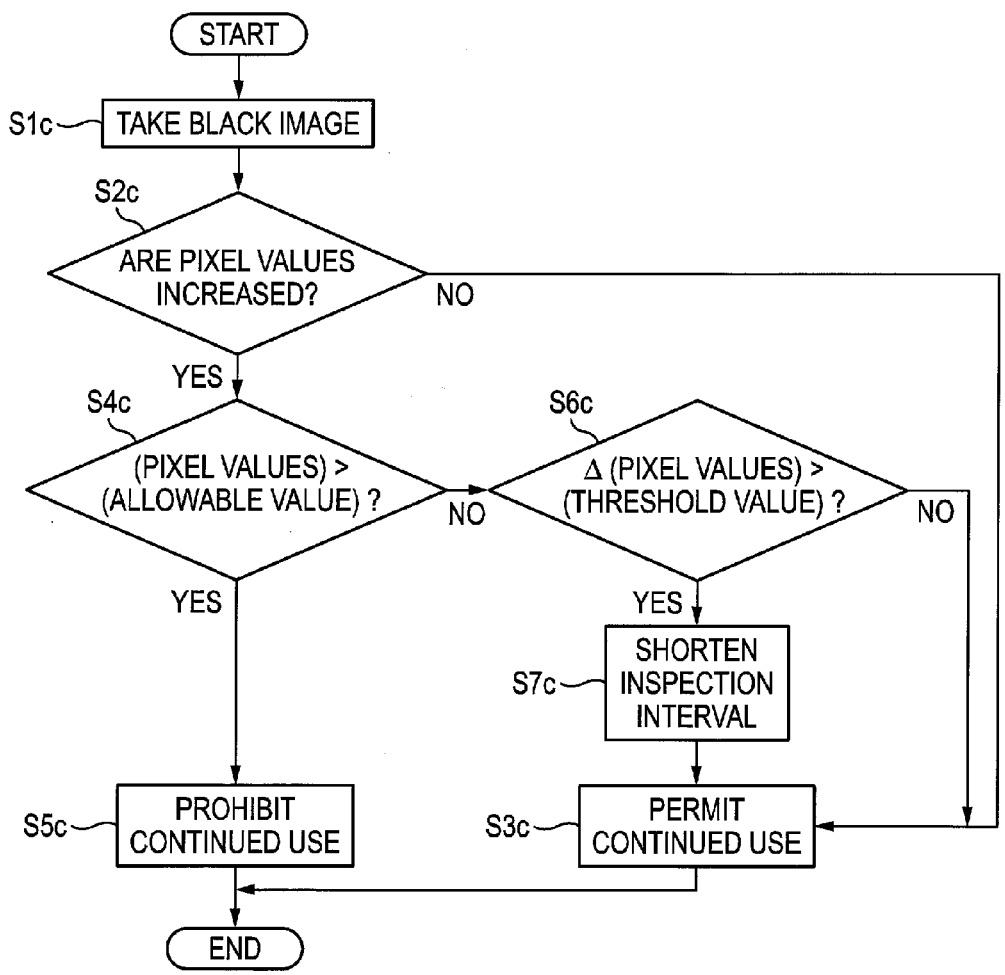
FIG. 10 is a flowchart of a maintenance method of a radiological image detection apparatus according to a further embodiment of the invention.

FIG. 10 is an inspection process according to a further embodiment which is applied to the cassette 1 and uses a dark current.

Typically, each pixel value of an image taken by the cassette 1 includes a dark current component caused by charge that is stored in the associated photoelectric conversion element 26 even in a state that it is shielded from light. The dark current component depends on temperature and typically increases with the temperature.

In the cassette 1, the insulative substrate has been peeled off as mentioned above and hence the cassette 1 lacks moisture resistance that would otherwise be provided by the insulative substrate. Therefore, moisture permeates into the sensor portion 11 over time and may cause deterioration of the photoelectric conversion elements 26. If the photoelectric conversion elements 26 deteriorate, charge that is stored in each photoelectric conversion element 26 in a state that it is shielded from light is increased and a dark current component included in each pixel value of an image taken by the cassette 1 is also increased. And when moisture permeates into the scintillator 10 as a result of the peeling of the insulative substrate, the same moisture has passed through the sensor portion 11. Therefore, deterioration of the photoelectric conversion elements 26 and the deterioration of the scintillator 10 occur approximately at the same position. Based on the above understanding, in this embodiment, deterioration of the scintillator 10 is detected by taking a black image regularly under a prescribed temperature condition without irradiation and monitoring a variation in the dark current component of each pixel of each image thus taken.

First, a black image is taken at the time of manufacture or shipment of the cassette 1 and pixel values (dark current components) of the respective pixels of the image thus taken are determined and employed as reference pixel values of the respective pixels.

At step S1c, a black image is taken (this is done regularly). At step S2c, pixel values of the respective pixels of the image thus taken are determined and it is judged whether or not the determined pixel values are increased from the reference pixel values.

If the determined pixel values are not increased from the reference pixel values, at step S3c continued use of the cassette 1 until the next inspection is permitted.

If the determined pixel values are increased from the reference pixel values, it is judged at step S4c whether or not the determined pixel values are out of an allowable range by comparing them with a predetermined allowable value.

If it is judged that one or plural ones of the determined pixel values or an average pixel value is out of the allowable range (i.e., larger than the allowable value), at step S5c the use of the cassette 1 is stopped and a proper measure such as replacement of the scintillator 10 is taken.

On the other hand, if it is judged that all the determined pixel values or the average pixel value is within the allowable range (i.e., smaller than or equal to the allowable value), at step S6c differences Δ from the corresponding pixel values of the image that was taken in the preceding inspection are compared with a preset threshold value for differences Δ. If the pixel value differences Δ are smaller than or equal to the threshold value, at step S3c continued use of the cassette 1 until the next inspection is permitted. On the other hand, if the pixel value differences Δ are larger than the threshold value, at step S7c the interval to the next dark current inspection is shortened.

If the differences Δ from the corresponding pixel values of the image that was taken in the preceding inspection are larger than the threshold value, the deterioration of the sensor portion 11 may be accelerating and the deterioration of the scintillator 10 may also be accelerating accordingly. Shortening the inspection interval makes it possible to detect deterioration of the scintillator 10 more properly and take a measure in good time.

Figure 11:
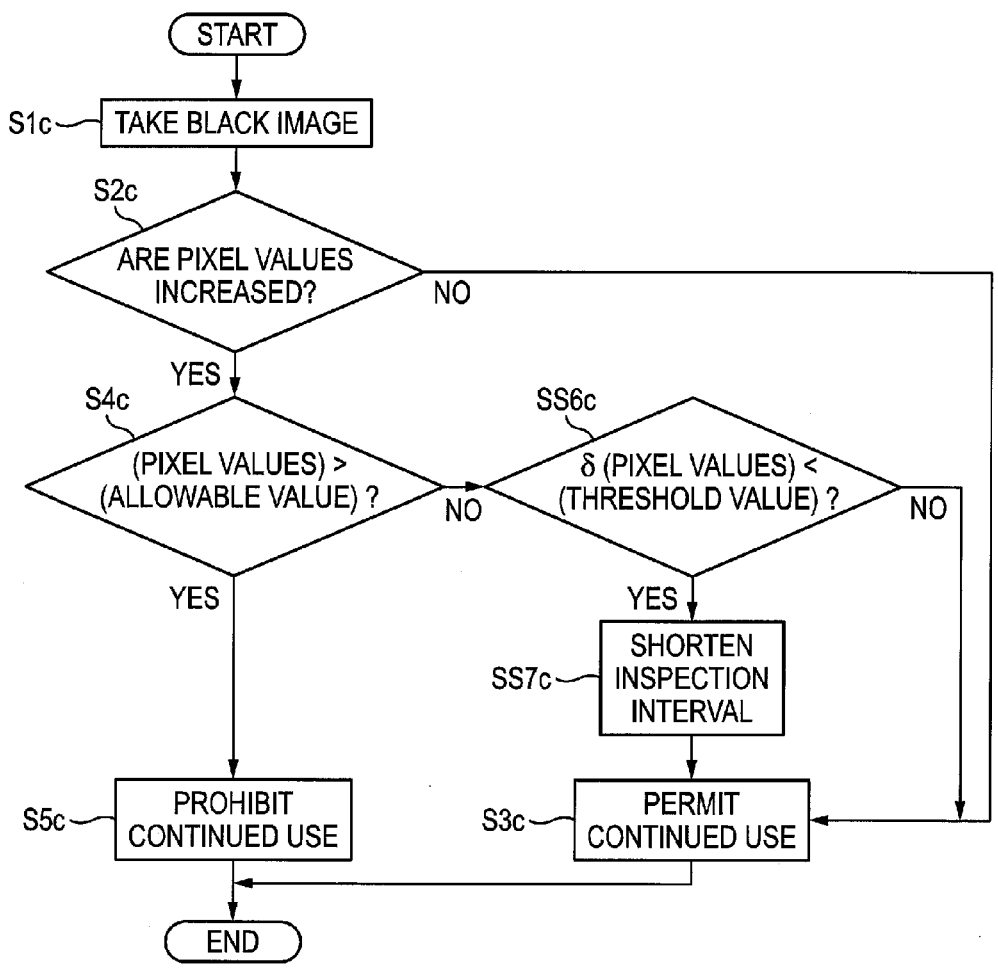
FIG. 11 is a flowchart of a maintenance method according to a modification of the embodiment of FIG. 10.

FIG. 11 is an inspection process according to a modification which is applied to the cassette 1 and uses a dark current.

If it is judged that all the determined pixel values or the average pixel value is within the allowable range, at step SS6c differences δ from the predetermined allowable value is compared with a preset threshold value for differences δ. If the differences δ are smaller than the threshold value, at step SS7c the interval to the next dark current inspection is shortened.

If the differences δ from the predetermined allowable value is smaller than the preset threshold value, the residual usable period of the scintillator 10 may be relatively short because the sensor portion 11 and hence the scintillator 10 has deteriorated to a large extent. Shortening the inspection interval makes it possible to detect deterioration of the scintillator 10 more properly and take a measure in good time.

Only one of the above-described structural noise inspection, MTF inspection, and dark current inspection may be performed singly. However, it is preferable that two or all of them be performed in combination. Synthesizing results of plural kinds of inspections makes it possible to detect deterioration of the cassette 1 more properly. Where plural kinds of inspections are performed in combination, they may be performed regularly from the beginning. Alternatively, only one kind of inspection may be performed regularly at the beginning. The other kind(s) of inspection(s) is performed additionally if it has been found by the one kind of inspection that deterioration of the scintillator 10 is in progress or is accelerating.

In the above MTF inspection and dark current inspection, a tendency that deterioration of the scintillator 10 or the sensor portion 11 is accelerating is detected by comparison with a preceding inspection result. However, accelerated deterioration of the scintillator 10 or the sensor portion 11 can also be caused by reduction in the adhesion between the scintillator 10 and the sensor portion 11 or between the sensor portion 11 and the top plate 5. In the cassette 1 which is a portable radiological image detection apparatus, such reduction in the adhesion between the scintillator 10 and the sensor portion 11 or between the sensor portion 11 and the top plate 5 may be caused by, for example, impact of a drop of the cassette 1 or mounting of a subject. In view of the above, the cassette 1 may be equipped with an impact detecting unit such as an acceleration sensor. If impact that is stronger than a prescribed threshold value is detected by the impact detecting means, the interval of the above-described structural noise inspection, MTF inspection, or dark current inspection is shortened.

Description will be made below on materials which can be used for constituent members of the sensor portion 11.

[Photoelectric Conversion Element]

Inorganic semiconductor materials such as amorphous silicon are often used for the photoconductive layer 20 (see FIG. 1) of the aforementioned photoelectric conversion elements 26. For example, any OPC (Organic Photoelectric Conversion) material disclosed in JP-A-2009-32854 may be used. A film formed out of the OPC material (hereinafter referred to as OPC film) may be used as the photoconductive layer 20. The OPC film contains an organic photoelectric conversion material, absorbing light emitted from a phosphor layer and generating electric charges in accordance with the absorbed light. Such an OPC film containing an organic photoelectric conversion material has a sharp absorption spectrum in a visible light range. Thus, electromagnetic waves other than light emitted from the phosphor layer are hardly absorbed by the OPC film, but noise generated by radiation such as X-rays absorbed by the OPC film can be suppressed effectively.

It is preferable that the absorption peak wavelength of the organic photoelectric conversion material forming the OPC film is closer to the peak wavelength of light emitted by the phosphor layer in order to more efficiently absorb the light emitted by the phosphor layer. Ideally, the absorption peak wavelength of the organic photoelectric conversion material agrees with the peak wavelength of the light emitted by the phosphor layer. However, if the difference between the absorption peak wavelength of the organic photoelectric conversion material and the peak wavelength of the light emitted by the phosphor layer is small, the light emitted by the phosphor layer can be absorbed satisfactorily. Specifically, the difference between the absorption peak wavelength of the organic photoelectric conversion material and the peak wavelength of the light emitted by the phosphor layer in response to radioactive rays is preferably not larger than 10 nm, more preferably not larger than 5 nm.

Examples of the organic photoelectric conversion material that can satisfy such conditions include arylidene-based organic compounds, quinacridone-based organic compounds, and phthalocyanine-based organic compounds. For example, the absorption peak wavelength of quinacridone in a visible light range is 560 nm. Therefore, when quinacridone is used as the organic photoelectric conversion material and CsI(Tl) is used as the phosphor layer material, the aforementioned difference in peak wavelength can be set within 5 nm so that the amount of electric charges generated in the OPC film can be increased substantially to the maximum.

At least a part of an organic layer provided between the bias electrode 22 and the charge collection electrode 24 can be formed out of an OPC film. More specifically, the organic layer can be formed out of a stack or a mixture of a portion for absorbing electromagnetic waves, a photoelectric conversion portion, an electron transport portion, an electron hole transport portion, an electron blocking portion, an electron hole blocking portion, a crystallization prevention portion, electrodes, interlayer contact improvement portions, etc.

Preferably the organic layer contains an organic p-type compound or an organic n-type compound. An organic p-type semiconductor (compound) is a donor-type organic semiconductor (compound) as chiefly represented by an electron hole transport organic compound, meaning an organic compound having characteristic to easily donate electrons. More in detail, of two organic materials used in contact with each other, one with lower ionization potential is called the donor-type organic compound. Therefore, any organic compound may be used as the donor-type organic compound as long as the organic compound having characteristic to donate electrons. Examples of the donor-type organic compound that can be used include a triarylamine compound, a benzidine compound, a pyrazoline compound, a styrylamine compound, a hydrazone compound, a triphenylmethane compound, a carbazole compound, a polysilane compound, a thiophene compound, a phthalocyanine compound, a cyanine compound, a merocyanine compound, an oxonol compound, a polyamine compound, an indole compound, a pyrrole compound, a pyrazole compound, a polyarylene compound, a fused aromatic carbocyclic compound (naphthalene derivative, anthracene derivative, phenanthrene derivative, tetracene derivative, pyrene derivative, perylene derivative, fluoranthene derivative), a metal complex having a nitrogen-containing heterocyclic compound as a ligand, etc. The donor-type organic semiconductor is not limited thereto but any organic compound having lower ionization potential than the organic compound used as an n-type (acceptor-type) compound may be used as the donor-type organic semiconductor.

The n-type organic semiconductor (compound) is an acceptor-type organic semiconductor (compound) as chiefly represented by an electron transport organic compound, meaning an organic compound having characteristic to easily accept electrons. More specifically, when two organic compounds are used in contact with each other, one of the two organic compounds with higher electron affinity is the acceptor-type organic compound. Therefore, any organic compound may be used as the acceptor-type organic compound as long as the organic compound having characteristic to accept electrons. Examples thereof include a fused aromatic carbocyclic compound (naphthalene derivative, anthracene derivative, phenanthrene derivative, tetracene derivative, pyrene derivative, perylene derivative, fluoranthene derivative), a 5- to 7-membered heterocyclic compound containing a nitrogen atom, an oxygen atom or a sulfur atom (e.g. pyridine, pyrazine, pyrimidine, pyridazine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazole, benzothiazole, carbazole, purine, triazolopyridazine, triazolopyrimidine, tetrazaindene, oxadiazole, imidazopyridine, pyralidine, pyrrolopyridine, thiadiazolopyridine, dibenzazepine, tribenzazepine etc.), a polyarylene compound, a fluorene compound, a cyclopentadiene compound, a silyl compound, and a metal complex having a nitrogen-containing heterocyclic compound as a ligand. The acceptor-type organic semiconductor is not limited thereto. Any organic compound may be used as the acceptor-type organic semiconductor as long as the organic compound has higher electron affinity than the organic compound used as the donor-type organic compound.

As for p-type organic dye or n-type organic dye, any known dye may be used. Preferred examples thereof include cyanine dyes, styryl dyes, hemicyanine dyes, merocyanine dyes (including zero-methine merocyanine (simple merocyanine)), trinuclear merocyanine dyes, tetranuclear merocyanine dyes, rhodacyanine dyes, complex cyanine dyes, complex merocyanine dyes, alopolar dyes, oxonol dyes, hemioxonol dyes, squarylium dyes, croconium dyes, azamethine dyes, coumarin dyes, arylidene dyes, anthraquinone dyes, triphenylmethane dyes, azo dyes, azomethine dyes, spiro compounds, metallocene dyes, fluorenone dyes, flugide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, quinophthalone dyes, phenoxazine dyes, phthaloperylene dyes, porphyrin dyes, chlorophyll dyes, phthalocyanine dyes, metal complex dyes, and fused aromatic carbocyclic dyes (naphthalene derivative, anthracene derivative, phenanthrene derivative, tetracene derivative, pyrene derivative, perylene derivative, fluoranthene derivative).

A photoelectric conversion film (photosensitive layer) which has a layer of a p-type semiconductor and a layer of an n-type semiconductor between a pair of electrodes and at least one of the p-type semiconductor and the n-type semiconductor is an organic semiconductor and in which a bulk heterojunction structure layer including the p-type semiconductor and the n-type semiconductor is provided as an intermediate layer between those semiconductor layers may be used preferably. The bulk heterojunction structure layer included in the photoelectric conversion film can cover the defect that the carrier diffusion length of the organic layer is short. Thus, the photoelectric conversion efficiency can be improved. The bulk heterojunction structure has been described in detail in JP-A-2005-303266.

It is preferable that the photoelectric conversion film is thicker in view of absorption of light from the phosphor layer. The photoelectric conversion film is preferably not thinner than 30 nm and not thicker than 300 nm, more preferably not thinner than 50 nm and not thicker than 250 nm, particularly more preferably not thinner than 80 nm and not thicker than 200 nm in consideration of the ratio which does make any contribution to separation of electric charges.

As for any other configuration about the aforementioned OPC film, for example, refer to description in JP-A-2009-32854.

[Switching Device]

Inorganic semiconductor materials such as amorphous silicon are often used for an active layer of each switching device 28. However, any organic material, for example, as disclosed in JP-A-2009-212389, may be used. Although the organic TFT may have any type of structure, a field effect transistor (FET) structure is the most preferable. In the FET structure, a gate electrode is provided on a part of an upper surface of an insulating substrate, and an insulator layer is provided to cover the electrode and touch the substrate in the other portion than the electrode. Further, a semiconductor active layer is provided on an upper surface of the insulator layer, and a transparent source electrode and a transparent drain electrode are disposed on a part of an upper surface of the semiconductor active layer and at a distance from each other. This configuration is called a top contact type device. However, a bottom contact type device in which a source electrode and a drain electrode are disposed under a semiconductor active layer may be also used preferably. In addition, a vertical transistor structure in which a carrier flows in the thickness direction of an organic semiconductor film may be used.

(Active Layer)

Organic semiconductor materials mentioned herein are organic materials showing properties as semiconductors. Examples of the organic semiconductor materials include p-type organic semiconductor materials (or referred to as p-type materials simply or as electron hole transport materials) which conduct electron holes (holes) as carriers, and n-type organic semiconductor materials (or referred to as n-type materials simply or as electrode transport materials) which conduct electrons as carriers, similarly to a semiconductor formed out of an inorganic material. Of the organic semiconductor materials, lots of p-type materials generally show good properties. In addition, p-type transistors are generally excellent in operating stability as transistors under the atmosphere. Here, description here will be made on a p-type organic semiconductor material.

One of properties of organic thin film transistors is a carrier mobility (also referred to as mobility simply) μ which indicates the mobility of a carrier in an organic semiconductor layer. Although preferred mobility varies in accordance with applications, higher mobility is generally preferred. The mobility is preferably not lower than $1.0*10^{-7}$ cm$^2$/Vs, more preferably not lower than $1.0*10^{-6}$ cm$^2$/Vs, further preferably not lower than $1.0*10^{-5}$ cm$^2$/Vs. The mobility can be obtained by properties or TOF (Time Of Flight) measurement when the field effect transistor (FET) device is manufactured.

The p-type organic semiconductor material may be either a low molecular weight material or a high molecular weight material, but preferably a low molecular weight material. Lots of low molecular weight materials typically show excellent properties due to easiness in high purification because various refining processes such as sublimation refining, recrystallization, column chromatography, etc. can be applied thereto, or due to easiness in formation of a highly ordered crystal structure because the low molecular weight materials have a fixed molecular structure. The molecular weight of the low molecular weight material is preferably not lower than 100 and not higher than 5,000, more preferably not lower than 150 and not higher than 3,000, further more preferably not lower than 200 and not higher than 2,000.

A phthalocyanine compound or a naphthalocyanine compound may be exemplified as such a p-type organic semiconductor material. A specific example thereof is shown as follows. M represents a metal atom, Bu represents a butyl group, Pr represents a propyl group, Et represents an ethyl group, and Ph represents a phenyl group.

[Chemical 1]

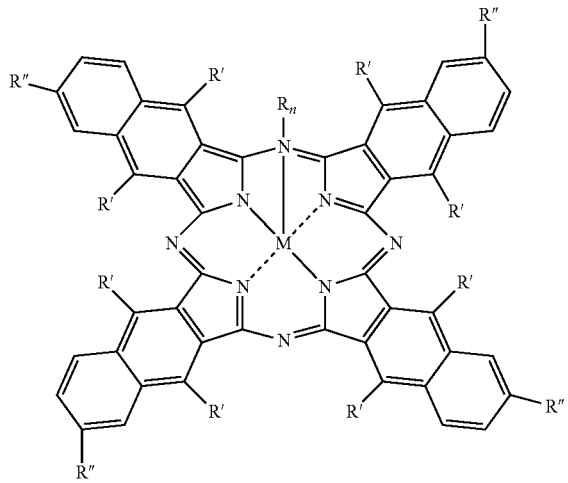

Compound 1 to 15

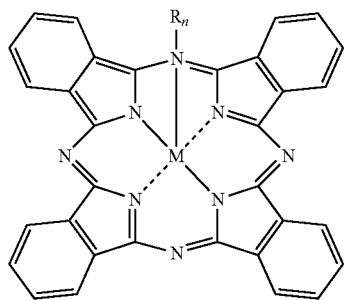

Compound 16 to 20

| Compound | M | R | N | R' | R" |
|---|---|---|---|---|---|
| 1 | Si | OSi(n-Bu)$_3$ | 2 | H | H |
| 2 | Si | OSi(i-Pr)$_3$ | 2 | H | H |
| 3 | Si | OSi(OEt)$_3$ | 2 | H | H |
| 4 | Si | OSiPh$_3$ | 2 | H | H |
| 5 | Si | O(n-C$_8$H$_{17}$) | 2 | H | H |
| 7 | Ge | OSi(n-Bu)$_3$ | 2 | H | H |
| 8 | Sn | OSi(n-Bu)$_3$ | 2 | H | H |
| 9 | Al | OSi(n-C$_6$H$_{13}$)$_3$ | 1 | H | H |
| 10 | Ga | OSi(n-C$_6$H$_{13}$)$_3$ | 1 | H | H |
| 11 | Cu | — | — | O(n-Bu) | H |
| 12 | Ni | — | — | O(n-Bu) | H |
| 13 | Zn | — | — | H | t-Bu |
| 14 | V=O | — | — | H | t-Bu |
| 15 | H$_2$ | — | — | H | t-Bu |
| 16 | Si | OSiEt$_3$ | 2 | — | — |
| 17 | Ge | OSiEt$_3$ | 2 | — | — |
| 18 | Sn | OSiEt$_3$ | 2 | — | — |
| 19 | Al | OSiEt$_3$ | 1 | — | — |
| 20 | Ga | OSiEt$_3$ | 1 | — | — |

(Constituent Members of Switching Device other than Active Layer)

The material forming the gate electrode, the source electrode or the drain electrode is not limited particularly if it has required electric conductivity. Examples thereof include: transparent electrically conductive oxides such as ITO (indium-doped tin oxide), IZO (indium-doped zinc oxide), SnO$_2$, ATO (antimony-doped tin oxide), ZnO, AZO (aluminum-doped zinc oxide), GZO (gallium-doped zinc oxide), TiO$_2$, FTO (fluorine-doped tin oxide), etc.; transparent electrically conductive polymers such as PEDOT/PSS (poly(3,4-ethylenedioxythiophene)/polystyrenesulfonate); carbon materials such as carbon nanotube; etc. These electrode materials may be formed into films, for example, by a vacuum deposition method, sputtering, a solution application method, etc.

The material used for the insulating layer is not limited particularly as long as it has required insulating effect. Examples thereof include: inorganic materials such as silicon dioxide, silicon nitride, alumina, etc.; and organic materials such as polyester (PEN (polyethylene naphthalate), PET (polyethylene terephthalate) etc.), polycarbonate, polyimide, polyamide, polyacrylate, epoxy resin, polyparaxylylene resin, novolak resin, PVA (polyvinyl alcohol), PS (polystyrene), etc. These insulating film materials may be formed into films, for example, by a vacuum deposition method, sputtering, a solution application method, etc.

As for any other configuration about the aforementioned organic TFT, for example, refer to the description in JP-A-2009-212389.

In addition, for example, amorphous oxide disclosed in JP-A-2010-186860 may be used for the active layer of the switching devices 28. Here, description will be made on an amorphous oxide containing active layer belonging to an FET transistor disclosed in JP-A-2010-186860. The active layer serves as a channel layer of the FET transistor where electrons or holes can move.

The active layer is configured to contain an amorphous oxide semiconductor. The amorphous oxide semiconductor can be formed into a film at a low temperature. Thus, the amorphous oxide semiconductor can be formed preferably on a flexible substrate. The amorphous oxide semiconductor used for the active layer is preferably of amorphous oxide containing at least one kind of element selected from a group consisting of In, Sn, Zn and Cd, more preferably of amorphous oxide containing at least one kind of element selected from a group consisting of In, Sn and Zn, further preferably of amorphous oxide containing at least one kind of element selected from a group consisting of In and Zn.

Specific examples of the amorphous oxide used for the active layer include $In_2O_3$, $ZnO$, $SnO_2$, $CdO$, Indium-Zinc-Oxide (IZO), Indium-Tin-Oxide (ITO), Gallium-Zinc-Oxide (GZO), Indium-Gallium-Oxide (IGO), and Indium-Gallium-Zinc-Oxide (IGZO).

It is preferable that a vapor phase film formation method targeting at a polycrystal sinter of the oxide semiconductor is used as a method for forming the active layer. Of vapor phase film formation methods, a sputtering method or a pulse laser deposition (PLD) method is suitable. Further, the sputtering method is preferred in view from mass productivity. For example, the active layer is formed by an RF magnetron sputtering deposition method with a controlled degree of vacuum and a controlled flow rate of oxygen.

By a known X-ray diffraction method, it can be confirmed that the active layer formed into a film is an amorphous film. The composition ratio of the active layer is obtained by an RBS (Rutherford Backscattering Spectrometry) method.

In addition, the electric conductivity of the active layer is preferably lower than $10^2$ $Scm^{-1}$ and not lower than $10^4$ $Scm^{-1}$, more preferably lower than $10^2$ $Scm^{-1}$ and not lower than $10^{-1}$ $Scm^{-1}$. Examples of the method for adjusting the electric conductivity of the active layer include an adjusting method using oxygen deficiency, an adjusting method using a composition ratio, an adjusting method using impurities, and an adjusting method using an oxide semiconductor material, as known.

As for any other configuration about the aforementioned amorphous oxide, for example, refer to description in JP-A-2010-186860.

[Flattening Layer and Adhesive Layer]

The flattening layer 23 and the adhesive layer 25 serving as the resin layer 14 for optically linking the scintillator 10 with the sensor portion 11 are not limited to particular ones as long as the fluorescence from the scintillator 10 is allowed to reach the sensor portion 11 without attenuation. The flattening layer 23 may be composed of resin such as polyimide and parylene. However, preferably, polyimide is employed that has a satisfactory film-fabrication property. The adhesive layer 25 may be composed of: adhesive such as UV curing adhesive, heat setting adhesive, room-temperature hardening type adhesive, and hot melt type adhesive; pressure sensitive adhesive such as rubber pressure sensitive adhesive, silicone pressure sensitive adhesive, and acrylic pressure sensitive adhesive; or a double-sided adhesive/pressure sensitive adhesive sheet whose two sides are provided with such adhesive or pressure sensitive adhesive. Here, from the perspective of the sharpness of the image, preferable adhesive is one composed of low-viscosity epoxy resin which allows formation of a sufficiently thin adhesive layer in comparison with the element size. Further, preferable pressure sensitive adhesive is acrylic pressure sensitive adhesive which is hardly degraded by light or oxidization.

The specification discloses the following maintenance method of a radiological image detection apparatus.

(1) An maintenance method of a radiological image detection apparatus including: a phosphor containing a fluorescent material which emits fluorescent light when exposed to radiation and a thin-film type sensor portion which is disposed adjacent to the phosphor on a radiation incidence side and supported by the phosphor and detects fluorescent light generated in the phosphor, the maintenance method comprising: regularly performing at least one of a structural noise inspection, an MTF inspection and a dark current inspection, to detect deterioration of the phosphor, in which the structural noise inspection includes taking a radiation image and detecting a variation in a pattern unique to the radiological image detection apparatus between the radiation image taken and an image taken in the past; the MTF inspection includes taking a radiation image of an MTF chart and detecting an MTF variation of the radiation image taken; and the dark current inspection includes taking a black image without irradiation and detecting a dark current variation in the sensor portion on the basis of the black image taken.

(2) The maintenance method of the radiological image detection apparatus according to (1), in which: an interval of the MTF inspection is shortened if a difference between an MTF value of the radiation image taken this time and an MTF value of a radiation image taken in a preceding MTF inspection is larger than a prescribed threshold value.

(3) The maintenance method of the radiological image detection apparatus according to (1), in which: an interval of the MTF inspection is shortened if a difference between an MTF value of the radiation image taken and an allowable value is smaller than a prescribed threshold value.

(4) The maintenance method of the radiological image detection apparatus according to any one of s (1) to (3), in which: an interval of the dark current inspection is shortened if at least one of differences between pixel values of the black image taken this time and pixel values of corresponding pixels of a black image taken in a preceding dark current inspection are larger than a prescribed threshold value.

(5) The maintenance method of the radiological image detection apparatus according to any one of s (1) to (3), in which: an interval of the dark current inspection is shortened if differences between pixel values of the black image taken and an allowable value are smaller than a prescribed threshold value.

(6) The maintenance method of the radiological image detection apparatus according to (2) or (3), in which: all of the structural noise inspection, the MTF inspection, and the dark current inspection are performed after the inspection interval is shortened.

(7) The maintenance method of the radiological image detection apparatus according to any one of (1) to (3), in which: the radiological image detection apparatus further comprises an impact detecting unit, and the inspection interval is shortened if the impact detecting unit detects impact that is stronger than a prescribed threshold value.

(8) The maintenance method of the radiological image detection apparatus according to (7), in which: the impact detecting unit is an acceleration sensor.

(9) The maintenance method of the radiological image detection apparatus according to any one of (1) to (3), in which: the fluorescent material is cesium iodide, sodium iodide, or a mixture in which an activator is added to cesium iodide or sodium iodide.

(10) The maintenance method of the radiological image detection apparatus according to (9), in which: the phosphor is formed out of a group of columnar crystals in which crystals of the fluorescent material have grown into columnar shapes.

(11) The maintenance method of the radiological image detection apparatus according to (10), in which: the radiological image detection apparatus further comprises: a housing that houses the phosphor and the sensor portion, and a surface of the sensor portion, opposite to a surface that is opposed to the phosphor is bonded to a top plate, serving to support a subject, of the housing.

(12) The maintenance method of the radiological image detection apparatus according to (11), in which: the surface of the sensor portion is bonded to the top plate via an adhesive layer.

(13) The maintenance method of the radiological image detection apparatus according to (1), in which: if the variation in the pattern unique to the radiological image detection apparatus is out of an allowable range, replacing the phosphor.

(14) The maintenance method of the radiological image detection apparatus according to (1), in which: if a MTF value of the radiation image taken this time is smaller than an allowable value, replacing the phosphor.

(15) The maintenance method of the radiological image detection apparatus according to (1), in which: if at least one of pixel values of the black image taken this time is larger than an allowable value, replacing the phosphor.

(16) The maintenance method of the radiological image detection apparatus according to (1), in which: if an average of pixel values of the black image take this time is larger than an allowable value, replacing the phosphor.

(17) The maintenance method of the radiological image detection apparatus according to any one of (1) to (3), in which: the sensor portion is formed by peeling off a substrate from a sensor panel.

(18) The maintenance method of the radiological image detection apparatus according to (1), in which: at least two of the structural noise inspection, the MTF inspection, and the dark current inspection are performed from an first-time operation of the maintenance method.

What is claimed is:

1. An maintenance method of a radiological image detection apparatus including: a phosphor containing a fluorescent material which emits fluorescent light when exposed to radiation and a thin-film type sensor portion which is disposed adjacent to the phosphor on a radiation incidence side and supported by the phosphor and detects fluorescent light generated in the phosphor, the maintenance method comprising:
   regularly performing at least one of a structural noise inspection and a dark current inspection, to detect deterioration of the phosphor, wherein:
   the structural noise inspection includes taking a radiation image and detecting a variation in a pattern unique to the radiological image detection apparatus between the radiation image taken and an image taken in the past; and
   the dark current inspection includes taking a black image without irradiation and detecting a dark current variation in the sensor portion on the basis of the black image taken;
   wherein an interval of the dark current inspection is shortened if differences between pixel values of the black image taken and an allowable value are smaller than a prescribed threshold value.

2. The maintenance method of the radiological image detection apparatus according to claim 1, wherein:
   all of the structural noise inspection and the dark current inspection are performed after the inspection interval is shortened.

3. The maintenance method of the radiological image detection apparatus according to claim 1, wherein:
   the radiological image detection apparatus further comprises an impact detecting unit, and
   the inspection interval is shortened if the impact detecting unit detects impact that is stronger than a prescribed threshold value.

4. The maintenance method of the radiological image detection apparatus according to claim 3, wherein:
   the impact detecting unit is an acceleration sensor.

5. The maintenance method of the radiological image detection apparatus according to claim 1, wherein:
   the fluorescent material is cesium iodide, sodium iodide, or a mixture in which an activator is added to cesium iodide or sodium iodide.

6. The maintenance method of the radiological image detection apparatus according to claim 5, wherein:
   the phosphor is formed out of a group of columnar crystals in which crystals of the fluorescent material have grown into columnar shapes.

7. The maintenance method of the radiological image detection apparatus according to claim 6, wherein:
   the radiological image detection apparatus further comprises:
   a housing that houses the phosphor and the sensor portion, and
   a surface of the sensor portion, opposite to a surface that is opposed to the phosphor is bonded to a top plate, serving to support a subject, of the housing.

8. The maintenance method of the radiological image detection apparatus according to claim 7, wherein:
   the surface of the sensor portion is bonded to the top plate via an adhesive layer.

9. The maintenance method of the radiological image detection apparatus according to claim 1, wherein:
   if the variation in the pattern unique to the radiological image detection apparatus is out of an allowable range, replacing the phosphor.

10. The maintenance method of the radiological image detection apparatus according to claim 1, wherein:
    if at least one of pixel values of the black image taken this time is larger than an allowable value, replacing the phosphor.

11. The maintenance method of the radiological image detection apparatus according to claim 1, wherein:
    if an average of pixel values of the black image take this time is larger than an allowable value, replacing the phosphor.

12. The maintenance method of the radiological image detection apparatus according to claim 1, wherein:
    the sensor portion is formed by peeling off a substrate from a sensor panel.

13. The maintenance method of the radiological image detection apparatus according to claim 1, wherein:

both of the structural noise inspection and the dark current inspection are performed from a first-time operation of the maintenance method.

14. The maintenance method of the radiological image detection apparatus according to claim 1, wherein:
the radiological image detection apparatus further comprises an impact detecting unit, and
the inspection interval is shortened if the impact detecting unit detects impact that is stronger than a prescribed threshold value.

15. An maintenance method of a radiological image detection apparatus including: a phosphor containing a fluorescent material which emits fluorescent light when exposed to radiation and a thin-film type sensor portion which is disposed adjacent to the phosphor on a radiation incidence side and supported by the phosphor and detects fluorescent light generated in the phosphor, the maintenance method comprising:
regularly performing at least one of a structural noise inspection, an MTF inspection and a dark current inspection, to detect deterioration of the phosphor, wherein:
the structural noise inspection includes taking a radiation image and detecting a variation in a pattern unique to the radiological image detection apparatus between the radiation image taken and an image taken in the past:
the MTF inspection includes taking a radiation image of an MTF chart and detecting an MTF variation of the radiation image taken; and
the dark current inspection includes taking a black image without irradiation and detecting a dark current variation in the sensor portion on the basis of the black image taken, and wherein:
the radiological image detection apparatus further comprises an impact detecting unit; and
the inspection interval is shortened if the impact detecting unit detects impact that is stronger than a prescribed threshold value.

16. The maintenance method of the radiological image detection apparatus according to claim 15, wherein:
an interval of the MTF inspection is shortened if a difference between an MTF value of the radiation image taken this time and an MTF value of a radiation image taken in a preceding MTF inspection is larger than a prescribed threshold value.

17. The maintenance method of the radiological image detection apparatus according to claim 15, wherein:
an interval of the MTF inspection is shortened if a difference between an MTF value of the radiation image taken and an allowable value is smaller than a prescribed threshold value.

18. A maintenance method of a radiological image detection apparatus including: a phosphor containing a fluorescent material which emits fluorescent light when exposed to radiation and a thin-film type sensor portion which is disposed adjacent to the phosphor on a radiation incidence side and supported by the phosphor and detects fluorescent light generated in the phosphor, the maintenance method comprising:
regularly performing at least one of a structural noise inspection, an MTF inspection and a dark current inspection, to detect deterioration of the phosphor, wherein:
the structural noise inspection includes taking a radiation image and detecting a variation in a pattern unique to the radiological image detection apparatus between the radiation image taken and an image taken in the past:
the MTF inspection includes taking a radiation image of an MTF chart and detecting an MTF variation of the radiation image taken; and
the dark current inspection includes taking a black image without irradiation and detecting a dark current variation in the sensor portion on the basis of the black image taken, and wherein:
the sensor portion is formed by peeling off a substrate from a sensor panel.

* * * * *